(12) United States Patent
Noguchi et al.

(10) Patent No.: US 8,276,550 B1
(45) Date of Patent: Oct. 2, 2012

(54) CONTROL SYSTEM OF INTERNAL COMBUSTION ENGINE

(75) Inventors: Yasushi Noguchi, Susono (JP);
Kyoung-Oh Kim, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 227 days.

(21) Appl. No.: 12/763,503

(22) Filed: Apr. 20, 2010

(51) Int. Cl.
*F02B 43/00* (2006.01)

(52) U.S. Cl. ... 123/1 A; 123/304; 123/575; 123/DIG. 12

(58) Field of Classification Search ............... 123/1 A, 123/304, 575, DIG. 12
See application file for complete search history.

(56) References Cited

U.S. PATENT DOCUMENTS

| | | | | |
|---|---|---|---|---|
| 4,223,642 A | * | 9/1980 | Okubo | 123/1 A |
| 4,478,177 A | * | 10/1984 | Valdespino | 123/3 |
| 5,419,286 A | * | 5/1995 | Edison et al. | 123/1 A |
| 2005/0229900 A1 | * | 10/2005 | Weber et al. | 123/316 |
| 2008/0241033 A1 | * | 10/2008 | Nazri | 423/237 |
| 2008/0308056 A1 | * | 12/2008 | Schiltz et al. | 123/1 A |
| 2010/0288249 A1 | * | 11/2010 | Sasaki et al. | 123/575 |
| 2011/0011354 A1 | * | 1/2011 | Dincer et al. | 123/3 |

FOREIGN PATENT DOCUMENTS

JP     A-5-332152     12/1993

* cited by examiner

*Primary Examiner* — Nathaniel Wiehe
*Assistant Examiner* — Hung Q Nguyen
(74) *Attorney, Agent, or Firm* — Oliff & Berridge, PLC

(57) ABSTRACT

A control system of an internal combustion engine enabling effect production of hydrogen and reliable promotion of burning of ammonia by a simple structure. The internal combustion engine uses ammonia as a fuel and is provided with a fuel injector injecting fuel into an intake passage and a variable operating mechanism able to change a valve opening operation of the intake valve. In the exhaust stroke, this temporarily opens the intake valve. Ammonia for hydrogen production is injected from a fuel injector into the gas flowing back at this time from the combustion chamber to the inside of the intake passage. As a result, hydrogen is produced from the ammonia. In the following intake stroke, this hydrogen is fed into the combustion chamber together with the ammonia and is burned together with the engine drive use ammonia.

2 Claims, 3 Drawing Sheets

CONTROL SYSTEM OF INTERNAL COMBUSTION ENGINE

BACKGROUND OF THE INVENTION

1. Field of the Invention

The present invention relates to a control system of an internal combustion engine.

2. Description of the Related Art

In an internal combustion engine, in the past, the fuel used has mainly been fossil fuels. However, in this case, burning such fuels produces $CO_2$, which causes global warming. On the other hand, burning ammonia does not produce $CO_2$ at all. Thus, there is known an internal combustion engine made so as to use ammonia as fuel and not produce $CO_2$ (for example, see Japanese Patent Publication (A) No. 5-332152).

However, ammonia is harder to burn compared with fossil fuels. Therefore, when using ammonia as fuel, some sort of measure is required for making the ammonia easier to burn. Thus, in the above-mentioned internal combustion engine, ammonia is made to flow through a heat exchange pipe extending inside the exhaust passage and exchange heat with the exhaust gas to thereby create hydrogen. This hydrogen is fed into the combustion chamber and made to burn with ammonia so that ammonia is easily burned.

As prior art, there is Japanese Patent Publication (A) No. 5-332152.

SUMMARY OF THE INVENTION

However, the ammonia receives heat from the exhaust gas via the heat exchange pipe so the heat efficiency is not necessarily high. Further, piping is necessary to introduce ammonia from the fuel tank to the heat exchange pipe and hydrogen from the heat exchange pipe to the combustion chamber. That is, in the above-mentioned internal combustion engine, ammonia cannot be efficiently used for exhaust purification with a simple structure.

To solve this problem, according to the present invention, there is provided a control system of an internal combustion engine using ammonia as a fuel and provided with a fuel injector injecting fuel into an intake passage and a variable valve operating mechanism able to change an opening operation of an intake valve, which system temporarily opens the intake valve in an exhaust stroke and injects ammonia for hydrogen production from the fuel injector into gas flowing back at this time from a combustion chamber to an inside of an intake passage so that hydrogen is produced from the ammonia and then feeds the hydrogen together with the air into the combustion chamber in a following intake stroke.

Summarizing the advantageous effects of the invention, ammonia can be efficiently produced with a simple structure and therefore combustion of ammonia can be reliably promoted.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
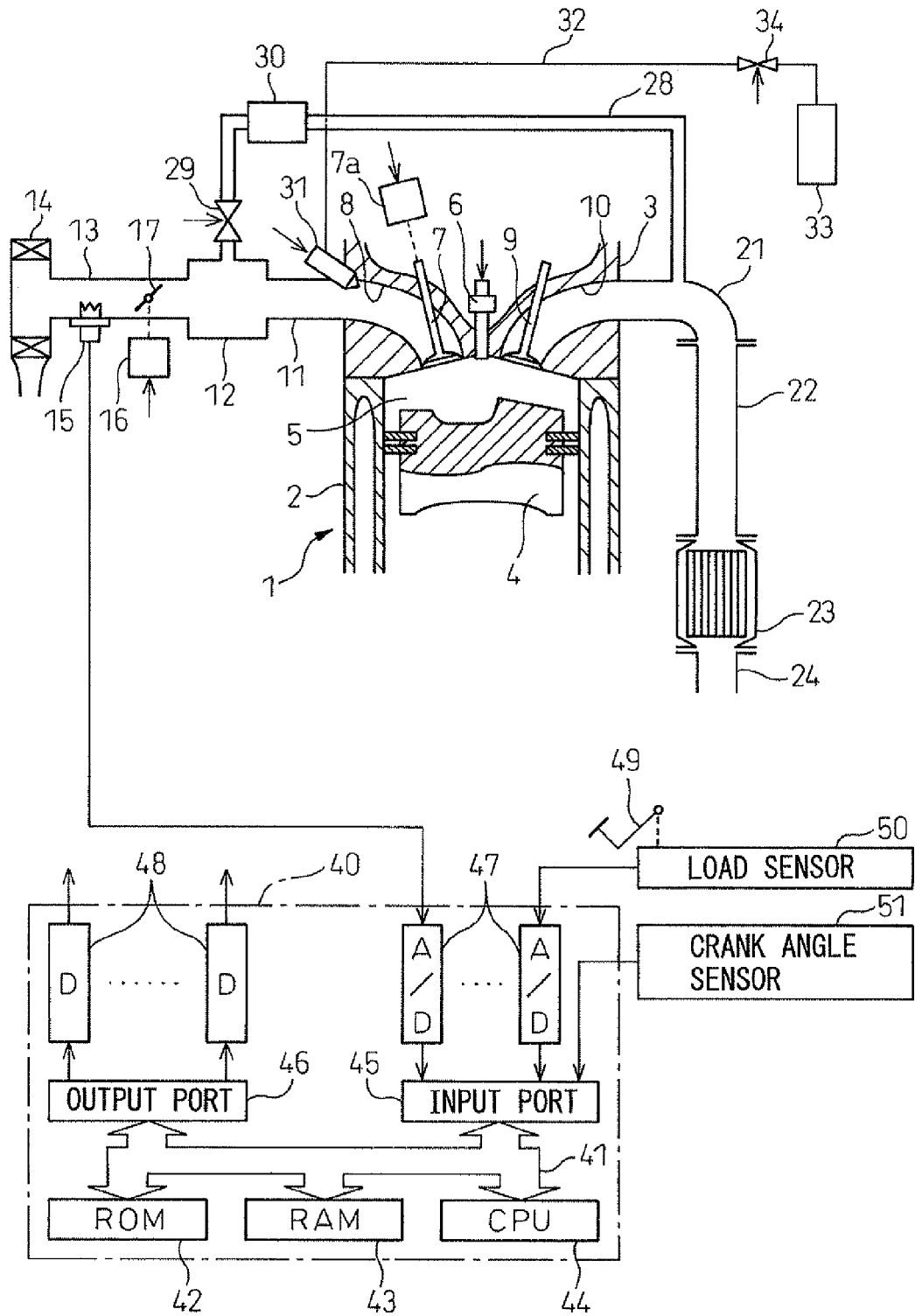
FIG. 1 is an overview of an internal combustion engine.

Referring to FIG. 1, 1 is an internal combustion engine body, 2 is a cylinder block, 3 is a cylinder head, 4 is a piston, 5 is a combustion chamber, 6 is an ignition device arranged in the combustion chamber 5, 7 is an intake valve driven by a variable valve operating mechanism 7, 8 is an intake port, 9 is an exhaust valve, and 10 is an exhaust port. The ignition device 6 can be comprised of a plasma jet spark plug emitting a plasma jet for example. The variable valve operating mechanism 7a can change properties of the valve opening operation such as the number of times of opening, opening timing, and opening period of the intake valve 7.

The intake port 8 is coupled through the intake runner 11 to a surge tank 12, while the surge tank 12 is coupled through an intake duct 13 to an air cleaner 14. Inside the intake duct 13, an air flowmeter 15 for detecting the amount of intake air and a throttle valve 17 driven by an actuator 16 are arranged. On the other hand, the exhaust port 10 is coupled through an exhaust manifold 21 and exhaust pipe 22 to a catalyst 23, while the catalyst 23 is coupled to an exhaust pipe 24.

The surge tank 12 and exhaust manifold 21 are connected to each other by an exhaust gas recirculation (hereinafter referred to as "EGR") passage 28. Inside the EGR passage 28, an electrical control type EGR control valve 29 and a cooling system 30 for cooling EGR gas are arranged.

In the embodiment shown in FIG. 1, the fuel used is ammonia. Inside the combustion chamber 5, a fuel injector 31 for injecting ammonia is arranged. The fuel injector 31 is connected trough a fuel feed path 32 to a fuel reservoir 33. Inside the fuel feed path 32, an electromagnetic shutoff valve 34 is arranged. The fuel reservoir 33 stores ammonia. The ammonia inside the fuel reservoir 33 is fed in the form of a gas or liquid into the fuel injector 31.

Note that in addition to ammonia, a fuel other than ammonia may also be used. The other fuel used may be for example gasoline, diesel oil, alcohol, or another such carbon-containing fuel.

The electronic control unit 40 is comprised of a digital computer provided with a ROM (read only memory) 42, RAM (random access memory) 43, CPU (microprocessor) 44, input port 45, and output port 46 all connected to each other through a bi-directional bus 41. The output signal of the air flowmeter 15 is input through a corresponding AD converter 47 to the input port 45. Furthermore, an accelerator pedal 49 is connected to a load sensor 50 generating an output voltage proportional to the amount of depression of the accelerator pedal 49. The output voltage of the load sensor 50 is input through a corresponding AD converter 47 to the input port 45. Further, the input port 45 is connected to a crank angle sensor 51 generating an output pulse each time the crankshaft rotates by for example 30°. In the CPU 44, the engine speed is calculated based on the output pulse from the crank angle sensor 51. On the other hand, the output port 46 is connected through a corresponding drive circuit 48 to the ignition device 6, variable valve operating mechanism 7a, actuator 16, EGR control valve 29, fuel injector 31, and shutoff valve 34.

As explained in the start as well, ammonia is harder to burn than a fossil fuel. Therefore, this embodiment of the present invention produces hydrogen from ammonia, feeds this hydrogen into the combustion chamber 5, and burns this together with the fuel of ammonia. This will be explained with reference to FIGS. 2A and 2B.

Figure 2A:
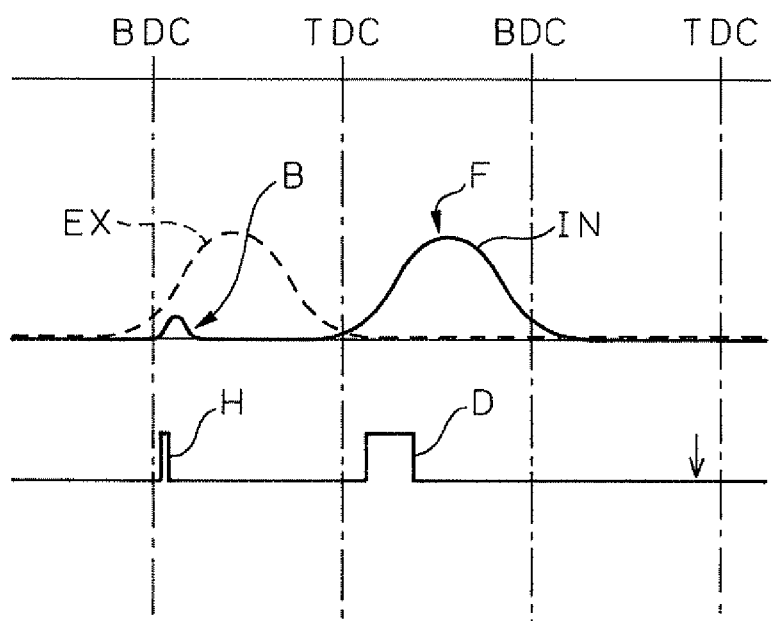
FIGS. 2A and 2B are timecharts explaining an embodiment according to the present invention.
Figure 2B:
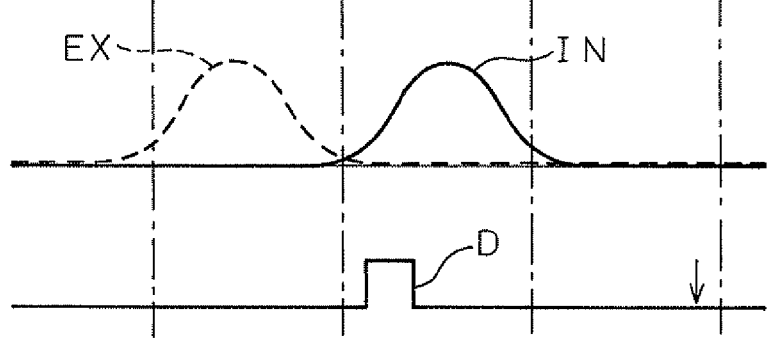

In FIGS. 2A and 2B, IN shows a lift curve of the intake valve 7, while EX shows a lift curve of the exhaust valve 9.

As shown by B in FIG. 2A, in the exhaust stroke, in particular in the first half of the exhaust stroke, the intake valve 7 is temporarily made to open. As a result, the considerably high temperature already burned gas flows back from the combustion chamber 5 to the inside of the intake port 8.

In addition to the above, as shown by H in FIG. 2A, ammonia for hydrogen production in this back flowing gas is injected from the fuel injector 31. As a result, the ammonia receives heat from the high temperature gas and breaks down whereby hydrogen is produced from the ammonia. Note that the ammonia H for hydrogen production does not contribute to the engine drive.

Next, as shown by F in FIG. 2A, when the intake valve 7 again opens and the intake stroke is started, hydrogen is fed together with the air or the air and the FGR gas into the combustion chamber 5. Further, as shown by D in FIG. 2A, in the intake stroke, ammonia for driving the engine, that is, the fuel of ammonia, is injected from the fuel injector 31 and sent into the combustion chamber 5.

Next, as shown by the arrow mark in FIG. 2A, the fuel is ignited by the ignition device 6 and is burned. In this case, since hydrogen is fed into the combustion chamber 5, the ammonia is burned well.

If doing this, the ammonia will directly contact the high temperature gas, so it is possible to produce hydrogen from ammonia by a high heat efficiency. Further, no special piping is required for producing and supplying the hydrogen. Therefore, it is possible to effectively produce hydrogen by a simple configuration.

On the other hand, when at the time of high load operation after warmup for example, hydrogen does not have to be produced and fed. In this case, as shown in FIG. 2B, the intake valve 7 is maintained in the closed state in the exhaust stroke and is opened once in the intake stroke. Further, ammonia H for hydrogen production is not injected. Only ammonia D for driving the engine is injected.

Figure 3:
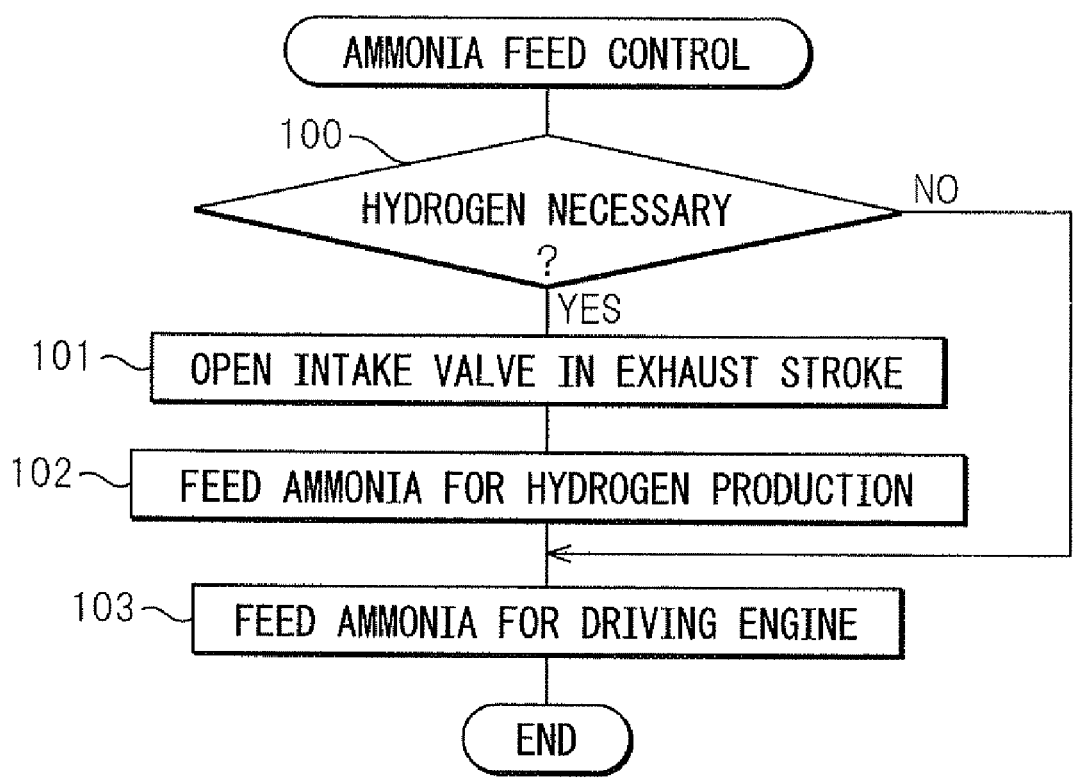
FIG. 3 is a flowchart showing an ammonia feed control routine.

FIG. 3 shows an ammonia feed control routine.

Referring to FIG. 3, at step 100, it is determined if the production and supply of hydrogen are necessary. When it is determined that the production and supply of hydrogen are necessary, next the routine proceeds to step 101 where the intake valve 7 is opened in the exhaust stroke. At the next step 102, ammonia for hydrogen production is injected from the fuel injector 31. At the next step 103, ammonia for driving the engine is injected from the fuel injector 31 in the intake stroke.

When it is determined that the production and supply of hydrogen are not necessary, the routine proceeds from step 100 to step 103. Therefore, ammonia for driving the engine is injected without ammonia for hydrogen production being injected.

While the invention has been described with reference to specific embodiments chosen for purpose of illustration, it should be apparent that numerous modifications could be made thereto by those skilled in the art without departing from the basic concept and scope of the invention.

The invention claimed is:

1. A control system of an internal combustion engine using ammonia as a fuel and having a fuel injector injecting fuel into an intake passage and a variable valve operating mechanism able to change an opening operation of an intake valve, the control system comprising:
a processor unit configured to control the variable valve operating mechanism to temporarily open the intake valve in an exhaust stroke and inject ammonia for hydrogen production from the fuel injector into gas flowing back at this time from a combustion chamber of the engine to an inside of the intake passage so that hydrogen is produced from the ammonia and then feed the hydrogen together with air into the combustion chamber in a following intake stroke.

2. A control system for an internal combustion engine as set forth in claim 1, wherein the processor unit is configured to control the fuel injector to inject ammonia for driving the engine in the intake stroke.

* * * * *